United States Patent [19]
Moffitt et al.

[11] Patent Number: 5,150,857
[45] Date of Patent: Sep. 29, 1992

[54] SHROUD GEOMETRY FOR UNMANNED AERIAL VEHICLES

[75] Inventors: Robert C. Moffitt, Seymour; Stephen J. Owen, Cheshire, both of Conn.

[73] Assignee: United Technologies Corporation, Hartford, Conn.

[21] Appl. No.: 744,560

[22] Filed: Aug. 13, 1991

[51] Int. Cl.$^5$ .............................................. B64C 39/06
[52] U.S. Cl. .................................. 244/12.2; 244/23 C; 244/34 A
[58] Field of Search ................ 244/12.2, 23.6, 26, 244/17.23, 17.11, 34 A; 416/128, 129

[56] References Cited

U.S. PATENT DOCUMENTS

| | | | |
|---|---|---|---|
| 2,935,275 | 5/1960 | Grayson | 244/23 C |
| 2,966,318 | 12/1960 | Chodar | 244/23 C |
| 3,002,709 | 10/1961 | Cochran | 244/12.2 |
| 3,103,327 | 9/1963 | Parry | 244/23 C |
| 3,395,876 | 8/1968 | Green | 244/23 C |
| 3,477,168 | 11/1969 | Trodgler | 244/23 C |
| 4,163,535 | 8/1979 | Austin | 244/12.23 |
| 4,196,877 | 4/1980 | Mutrux | 244/12.2 |
| 5,035,377 | 7/1991 | Buchelt | 244/23 C |

FOREIGN PATENT DOCUMENTS

| | | | |
|---|---|---|---|
| 2718178 | 11/1978 | Fed. Rep. of Germany | 244/12.2 |
| 75976 | 7/1961 | France | 244/23 C |

Primary Examiner—Galen Barefoot
Attorney, Agent, or Firm—Terrance J. Radke

[57] ABSTRACT

An unmanned aerial vehicle having a toroidal fuselage that surrounds a pair of coaxial, multi-bladed, counter-rotating rotors. The toroidal fuselage has an airfoil profile that is optimized to provide high hover efficiency and produce a pressure distribution that provide high lift forces. The airfoil profile is further optimized to counteract the undesirable nose-up pitching moments experienced by ducted rotary-type UAVs in forward translational flight.

7 Claims, 8 Drawing Sheets

SHROUD GEOMETRY FOR UNMANNED AERIAL VEHICLES

RELATED APPLICATION

The present application is related to commonly-owned, co-pending U.S. patent application Ser. No. 07/526,092, filed May 18, 1990, entitled AN UNMANNED FLIGHT VEHICLE INCLUDING COUNTER ROTATING ROTORS POSITIONED WITHIN A TOROIDAL SHROUD AND OPERABLE TO PROVIDE ALL REQUIRED VEHICLE FLIGHT CONTROLS.

TECHNICAL FIELD

The present invention relates to unmanned aerial vehicles (UAVs), and more particularly, to a UAV having a toroidal fuselage (shroud) and a pair of coaxial, counter-rotating, ducted, multi-bladed rotors wherein the aerodynamic configuration of the toroidal fuselage is optimized to minimize UAV nose-up pitching moments in translational flight.

BACKGROUND OF THE INVENTION

There has been a recent resurgence in the interest in unmanned aerial vehicles (UAVs) for performing a variety of missions where the use of manned flight vehicles is not deemed appropriate, for whatever reason. Such missions include surveillance, reconnaissance, target acquisition and/or designation, data acquisition, communications datalinking, decoy, jamming, harassment, or one-way supply flights. This interest has focused mainly on UAVs having the archetypical airplane configuration, i.e., fuselage, wings having horizontally mounted engines for translation flight, and empennage, as opposed to "rotor-type" UAVs, for several reasons.

First, the design, fabrication, and operation of "winged" UAVs is but an extrapolation of the manned flight vehicle art, and therefore, may be accomplished in a relatively straightforward and cost effective manner. In particular, the aerodynamic characteristics of such UAVs are well documented such that the pilotage (flight operation) of such vehicles, whether by remote communications datalinking to and/or software programming of an on-board flight computer, is relatively simple.

Additionally, the range and speed of such UAVs is generally superior to rotor-type UAVs. Moreover, the weight-carrying capacity of such UAVs is generally greater than rotor-type UAVs such that winged UAVs may carry a larger mission payload and/or a larger fuel supply. These characteristics make winged UAVs more suitable than rotor-type UAVs for certain mission profiles involving endurance and distance. Winged UAVs, however, have one glaring deficiency that severely limits their utility.

More specifically, winged UAVs do not have a fixed spatial point "loiter" capability. For optimal performance of many of the mission profiles described hereinabove, it is desirable that the UAV have the capability to maintain a fixed spatial frame of reference with respect to static ground points for extended periods of time, e.g., target designation. One skilled in the art will appreciate that the flight characteristics of winged UAVs are such that winged UAVs cannot maintain a fixed spatial frame of reference with respect to static ground points, i.e., loiter. Therefore, mission equipment of winged UAVs must utilize complex and costly motion-compensating means to suitably perform such mission profiles.

Rotor-type UAVs, in contrast, are aerodynamically suited for such loiter-type mission profiles. The rotor subsystems of such UAVs may be operated so that the vehicle hovers at a fixed spatial frame of reference with respect to a static ground point. Prior art ducted rotor-type UAV designs, however, were generally deficient in that such UAVs experienced nose-up pitching moments in translational flight. Several examples of such vehicles are described in commonly-owned, co-pending application Ser. No. 07/526,092, filed May 18, 1990, entitled AN UNMANNED FLIGHT VEHICLE INCLUDING COUNTER ROTATING ROTORS POSITIONED WITHIN A TOROIDAL SHROUD AND OPERABLE TO PROVIDE ALL REQUIRED VEHICLE FLIGHT CONTROLS. In general, many prior art ducted rotor-type UAVs incorporated ancillary aerodynamic structures, with or without control surfaces, into the UAVs to counteract such nose-up pitching moments. These vehicles are, in essence, hybrids of winged and rotor-type UAVs.

While the utilization of such ancillary aerodynamic structures represents one possible solution to the nose-up pitching problem, such a solution impairs the overall performance of the UAVs. Aerodynamically, such ancillary aerodynamic structures increase the overall drag characteristics of the vehicle. In addition, such ancillary aerodynamic structures add to the gross vehicle structural weight. Both of these factors may necessitate the utilization of a higher horsepower powerplant (or a reduction in vehicle flight range and/or speed).

Another possible solution is the utilization of cyclic pitch to counteract the nose-up pitching moment experienced by ducted UAVs in forward translational flight. The utilization of cyclic pitch to counteract the nose-up pitching moments is described in in commonly-owned, co-pending application Ser. No. 07/526,092, filed May 18, 1990, entitled AN UNMANNED FLIGHT VEHICLE INCLUDING COUNTER ROTATING ROTORS POSITIONED WITHIN A TOROIDAL SHROUD AND OPERABLE TO PROVIDE ALL REQUIRED VEHICLE FLIGHT CONTROLS. While the utilization of cyclic pitch to counteract the fuselage-induced nose-up pitching moment experience by ducted UAVs in forward translational flight is feasible, a performance penalty is incurred in the form of lost lift which requires an increase in engine power output to augment the lift via the rotor assembly. Further details regarding the utilization of cyclic pitch in this manner are set forth hereinbelow.

A need exists for a means of counteracting the undesirable nose-up pitching moments experienced by ducted rotary-type UAVs in forward translational flight. Such means should minimize cyclic trim pitch requirements and rotor assembly power requirements while concomitantly providing high hover efficiency.

SUMMARY OF THE INVENTION

One object of the present invention is to provide an unmanned rotary-type aerial vehicle (UAV) that includes a toroidal fuselage having an optimized aerodynamic configuration that provides high hover efficiency and produces pressure distributions that provide high lift forces.

Another object of the present invention is to provide a UAV that includes a toroidal fuselage having an airfoil configuration optimized to counteract the undesirable nose-up pitching moment experienced by ducted rotary-type UAVs in forward translational flight.

Yet another object of the present invention is to provide a UAV having an optimized airfoil configuration that minimizes cyclic trim pitch requirements for trimmed forward translational flight.

Still another object of the present invention is to provide an optimized airfoil configuration for a UAV that minimizes rotor assembly power requirements in trimmed forward translational flight.

Yet one more object of the present invention is to provide an optimized airfoil profile having an aerodynamic surface that is highly cambered.

Still yet another object of the present invention is to provide an optimized airfoil configuration having an aerodynamic surface that includes a dorsal surface having reflex camber.

Yet one more object of the present invention is to provide an optimized airfoil configuration that includes a dorsal surface having a droop portion.

These and other objects are achieved by means of an unmanned aerial vehicle (UAV) according to the present invention that includes a toroidal fuselage or shroud having an airfoil profile that is optimized to minimize nose-up pitching moments during translation flight, a rotor assembly, a powerplant assembly, and flight/mission equipment. The rotor assembly includes a pair of multi-bladed, counter-rotating rotors coaxially aligned with the axis of the toroidal fuselage such that the rotors are "shrouded" by the toroidal fuselage. The rotor assembly further includes first and second conventional swashplate subassemblies to selectively mechanically couple cyclic pitch inputs and/or collective pitch inputs to the respective counter-rotating rotors, conventional gear trains driven by the powerplant assembly to impart rotary motion to the respective counter-rotating rotors.

The powerplant assembly includes an engine housing having an inlet, an engine mounted in the housing, a drive train subassembly, and one or more fuel tanks. The engine housing is an integral part of the toroidal fuselage and located at the 0°/360° azimuthal station (the aft station) of the toroidal fuselage. The drive train subassembly is operative to transfer the power developed by the engine to the gear trains of the rotor assembly.

The toroidal fuselage has a plurality of support struts integrally formed with and extending radially outwardly from the inner periphery of the toroidal fuselage to the rotor assembly for rigid attachment thereto to support the rotor assembly in a fixed coaxial relation to the toroidal fuselage. The support struts are hollow to minimize the overall weight of the UAV. The toroidal fuselage and the plurality of support struts are preferably fabricated from composite material to provide a high strength structure of minimal weight, and the toroidal fuselage is fabricated as a closed toroid to provide maximum structural strength. The toroidal fuselage is partially hollow, and fabricated so as to provide accessible internal equipment bays.

The fuel tanks are disposed within appropriate equipment bays, as is the mission payload equipment which will consist of some type of passive sensor such as infrared, television, etc., and/or an active device such as a laser, radio communications link, radar, etc., and associated signal processing equipment. Other flight/mission equipment such as avionics, navigation equipment, flight computer, communications gear are distributed in various equipment bays.

The UAV of the present invention has an aerodynamically configured toroidal fuselage that includes an inner duct flow channel and an outer aerodynamic surface. The outer aerodynamic surface of the present invention has been optimized to retain the functional performance provided by the inner duct flow channel, i.e., high hover efficiency. The inner duct flow channel comprises the arcuate inlet surface and the cylindrical flow surface.

The arcuate inlet surface is formed with a predetermined radius of curvature that provides a smooth transition between the ventral surface of the outer aerodynamic surface and the cylindrical flow surface and facilitates mass airflow into the inner duct flow channel at high velocities. The mass airflow over the arcuate inlet surface creates a pressure distribution that contributes to the overall lift produced by the toroidal fuselage. Selection of a value for the predetermined radius of curvature is based upon evaluations of the ratios of the arcuate inlet surface radius to the diameter of the counter-rotating rotors versus figure of merit values where figure of merit defines the ratio of actual power required to produce lift in a UAV to the ideal power required. Essentially, an r/D ratio of 0.04 or greater will produce an acceptable figure of merit.

Selection of a value for the length of the cylindrical flow surface is based upon the fact that the greater the length of the cylindrical flow surface, the higher likelihood that overall lift will be provided in approximately equal proportions by the pressure distributions resulting from mass airflow through the rotor assembly and over the toroidal fuselage. With the rotor assembly and the toroidal fuselage providing approximately equal lift, smaller diameter rotors may be utilized with the concomitant reduction in size and weight of the UAV.

The outer aerodynamic surface is further optimized to provide a pressure distribution that produces high lift forces at the negative angles of attack required for trimmed translational flight of the UAV of the present invention. It will be appreciated that rotor assembly lift induces suction on the forward arcuate inlet surface, thus producing the adverse nose-up pitching moment on the UAV. The high lift forces generated by the outer aerodynamic surface of the toroidal fuselage reduces the required rotor assembly lift, thereby reducing the undesirable pitching moment. A reduction in power is effected by the decreased requirement for rotor lift and reduced need for superimposed cyclic pitch (moment trim).

The outer aerodynamic surface includes a ventral surface, a lateral surface, and a dorsal surface. The aerodynamic surface of the present invention includes a leading edge at profile coordinates $Y/C=0.0$, $X/C=0.0$ and a trailing edge (the lower edge of the cylindrical flow surface at $X/C=1.0$, $Y/C=0.02375$). The chord C (or depth) of the toroidal fuselage airfoil is the orthogonal distance between the leading edge and the plane of the trailing edge. The aerodynamic surface is highly cambered (using the conventional definition of airfoil camber). The dorsal surface may be reflex cambered as necessary to achieve closure between the leading edge and the trailing edge. Both the ventral surface and the lateral surface are slightly convex with respect to the trailing edge of the cylindrical flow surface. The portion of the dorsal surface adjacent the leading edge defines a droop portion, an arcuate surface defined by the normalized radius of 0.175 R (where R is the diameter of the rotors).

BRIEF DESCRIPTION OF THE DRAWINGS

A more complete understanding of the present invention and the attendant features and advantages thereof may be had by reference to the following detailed description of the invention when considered in conjunction with the accompanying drawings wherein.

DETAILED DESCRIPTION OF PREFERRED EMBODIMENTS

Figure 1:
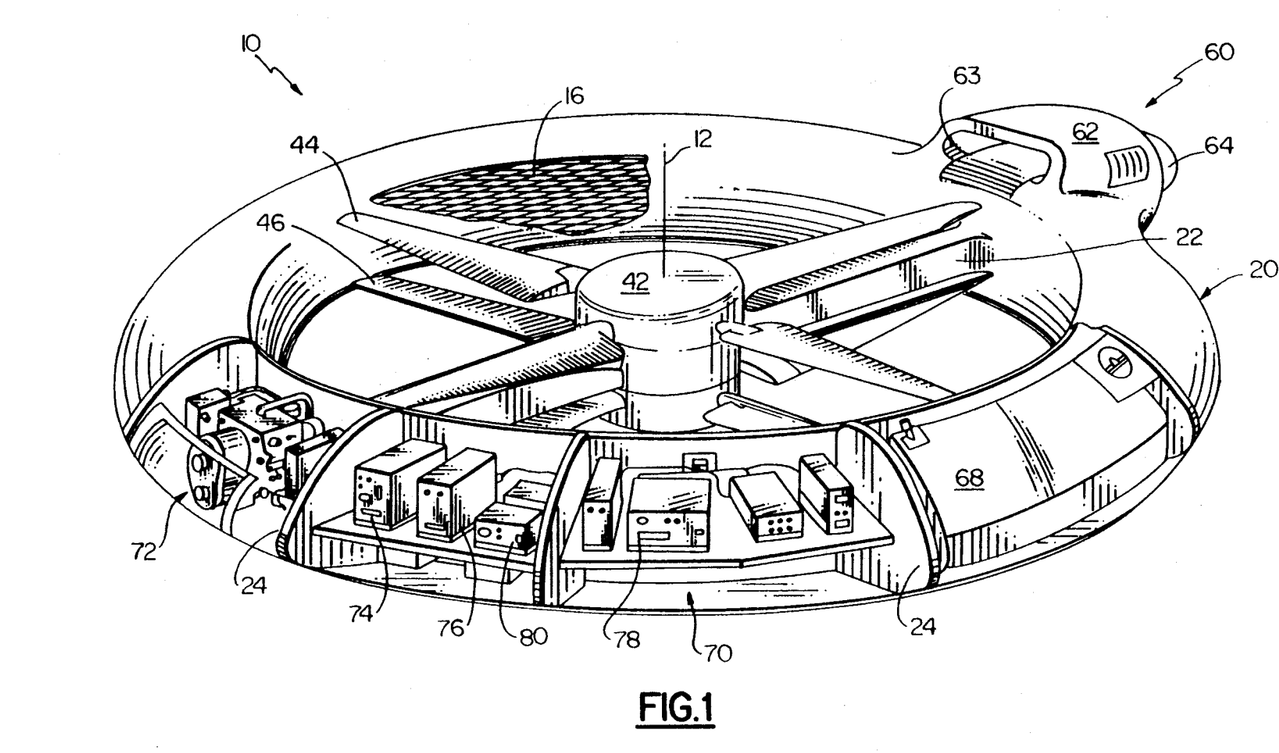
FIG. 1 is a perspective view of an one embodiment of an unmanned aerial vehicle (UAV), which is partially broken away to illustrate the internal compartmentalization of flight/mission equipment.
Figure 2:
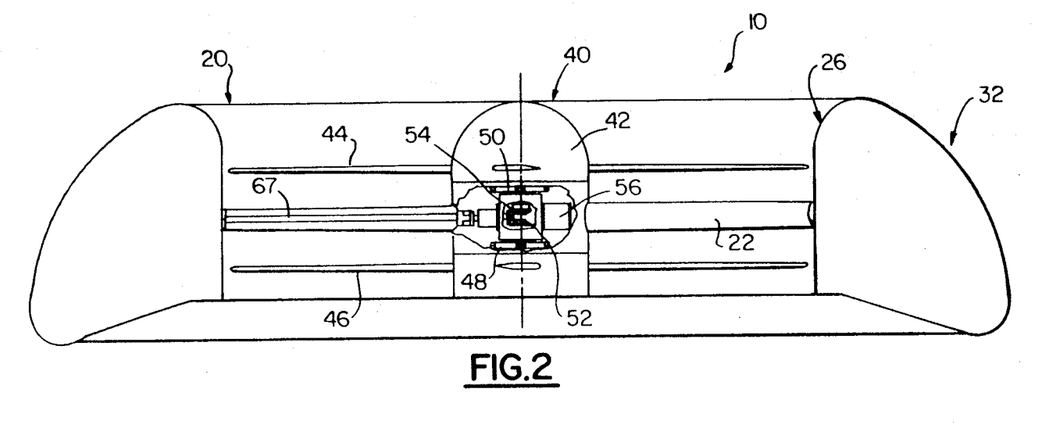
FIG. 2 is a cross-sectional view of the UAV of FIG. 1 illustrating the aerodynamic configuration of the toroidal fuselage according to the present invention.

Referring now to the drawings wherein like reference numerals illustrate corresponding or similar elements throughout several views, FIGS. 1, 2 illustrate one embodiment of an unmanned aerial vehicle (UAV) 10 according to the present invention. The UAV 10 comprises a toroidal fuselage or shroud 20 having an aerodynamic configuration optimized to minimize nose-up pitching moments during translation flight, as described in greater detail hereinbelow, a rotor assembly 40, a powerplant assembly 60, and flight/mission equipment 70. Reference numeral 12 defines the fuselage axis of the UAV 10.

The rotor assembly 40 includes a rotor housing 42 and a pair of multi-bladed, counter-rotating rotors 44, 46 coaxially aligned with the fuselage axis 12. In effect, the rotors 44, 46 are "shrouded" by the toroidal fuselage 20. The rotors 44, 46 are preferably of the rigid rotor type (as opposed to articulated rotors) to reduce the complexity and weight of the rotor assembly 40. The rotor assembly 40 further includes first and second conventional swashplate subassemblies 48, 50, conventional gear trains 52, 54, and an electronic control servo subsystem 56 disposed within the rotor housing 42.

The swashplate subassemblies 48, 59, which may be of the type illustrated and described in U.S. Pat. Nos. 3,409,249 and 2,957,527, are operative to selectively mechanically couple cyclic pitch inputs and/or collective pitch inputs to the respective counter-rotating rotors 44, 46. The electronic control servo subsystem 56, which may be of the type illustrated and described in commonly-owned, co-pending U.S. patent application Ser. No. 07/454,488, filed Dec. 21, 1989, entitled SERVO CONTROL SYSTEM FOR A CO-AXIAL ROTARY WINGED AIRCRAFT, which is incorporated herein by reference, is operative to control the functioning of the swashplate subassemblies 48, 50 by coupling inputs from the UAV 10 flight computer to the swashplate subassemblies 48, 50. The conventional gear trains 52, 54, which are driven by the powerplant assembly 60 described hereinbelow, are operative to impart rotary motion to the respective counter-rotating rotors 44, 46.

The powerplant assembly 60 includes an engine housing 62 having an inlet 63, an engine 64, drive train subassembly 66, and one or more fuel tanks 68. The engine housing 62, which is an integral part of the toroidal fuselage 20, is located at the 0°/360° azimuthal station (the aft station) of the toroidal fuselage 20 as illustrated in FIG. 1. The engine 64 is mounted within the engine housing 62. The aft positioning of the engine 64 was selected to counterbalance the weight of the flight/mission equipment 70, which is disposed in the forward portion of the toroidal fuselage 20 as described in further detail hereinbelow. Air enters the engine housing 62 through the forward facing inlet 63 to supply the the engine 64 with the oxygen necessary for combustion.

The drive train subassembly 66 is operative to transfer the power developed by the engine 64 to the gear trains 52, 54 of the rotor assembly 40. The conventional drive train subassembly 66 may include a clutch (not specifically illustrated), gear trains (not specifically illustrated), and a drive shaft 67.

The toroidal fuselage 20 has a plurality of support struts 22 integrally formed with and extending radially outwardly from the inner periphery of the toroidal fuselage 20 to the rotor housing 42. The support struts 22, which are rigidly attached to the rotor housing 42 in known conventional manner, are operative to support the rotor assembly 40 in a fixed coaxial relation to the toroidal fuselage 20, i.e., the rotational axis of the rotor assembly 40 coincides with the fuselage axis 12. The support struts 22 are hollow to minimize the overall weight of the UAV 10, and to provide conduits for interconnecting operating elements of the UAV 10. For example, the drive shaft 67 is routed through one of the support struts 22, as illustrated in FIG. 2. In addition, the electrical interface wiring for the electronic control servo subsystem 56 is routed through another support strut 22.

The toroidal fuselage 20 and the plurality of support struts 22 are preferably fabricated from composite material to provide a high strength structure of minimal weight. The various types of high tensile strength fibrous materials and resins having utility in the formation of aerospace composite structures are well known to those skilled in the art. The toroidal fuselage 20 is fabricated as a closed toroid to provide a maximum structural strength. The toroidal fuselage 20 is partially hollow, and fabricated so as to provide accessible internal equipment bays 24.

The fuel tanks 68 of the UAV 10 are disposed within appropriate equipment bays 24. Preferably, the fuel tanks 68 are disposed in opposed equipment bays 24 at the 90°, 270° azimuthal stations (the lateral stations) for weight and balance considerations. Forward located equipment bays 24 are utilized for the flight/mission equipment 70 as described in the following paragraph.

The mission payload equipment 72 is preferably located in the equipment bay 24 at the 180° azimuthal station (the forward station). Generally, the mission payload will consist of some type of passive sensor, e.g., infrared, television, etc., and/or active device, e.g., laser, radio communications link, radar, etc., and associated signal processing equipment, and the forward equipment bay 24 provides the best field-of-view for such payload equipment 72. Other flight/mission equipment 70 such as avionics 74, navigation equipment 76, flight computer 78, communications gear 80 (for relaying real time sensor data and receiving command signal inputs), antennae, etc. are distributed in the various forward equipment bays 24 adjacent the forward station. Distribution of the various flight/mission equipment 70 and the fuel tanks 68 within the various equipment bays 24 is optimized, in conjunction with the powerplant assembly 60, for weight and balance so that the center of gravity of the UAV 10 coincides with the fuselage axis 12.

Optionally, the UAV 10 of the present invention may include an inlet screen 16, disposed as partially illustrated in FIG. 1, to protect the rotor assembly 40 from FOD. The UAV 10 may also include an outlet screen (not illustrated) to protect the rotor assembly 40.

Figure 2A:
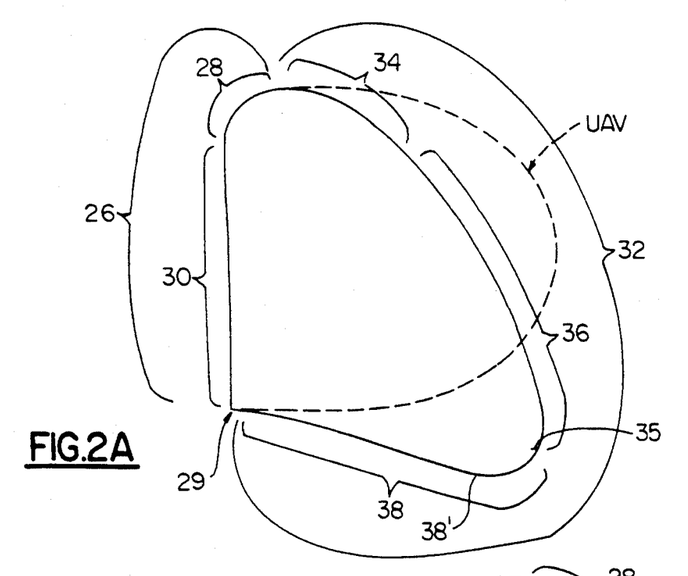
FIG. 2A is an enlarged cross-sectional view of the toroidal fuselage of FIG. 2 depicting the optimized configuration of the outer aerodynamic surface of the toroidal fuselage.

The aerodynamic configuration of the toroidal fuselage 20, illustrated generally in FIG. 2 and in further detail in FIG. 2A, includes an inner duct flow channel 26 and an outer aerodynamic surface 32. The inner duct flow channel 26 comprises an arcuate inlet surface 28 and a cylindrical flow surface 30. The outer aerodynamic surface 32 comprises a ventral surface 34, a lateral surface 36, and a dorsal surface 38.

Figure 3:
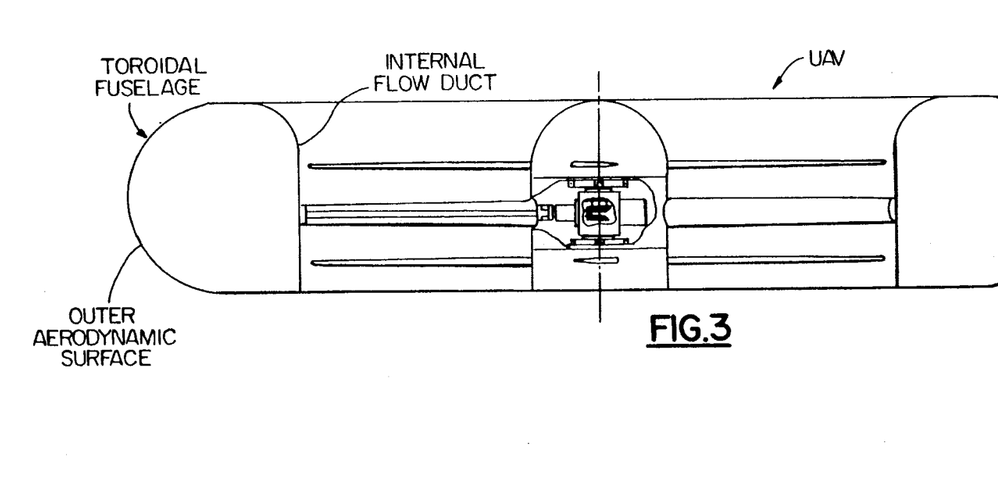
FIG. 3 is a partial cross-sectional view similar to FIG. 2 illustrating a non-optimal aerodynamic surface configuration for a toroidal fuselage.

To facilitate a more complete understanding of the aerodynamic characteristics of the UAV 10 of the present invention, and in particular the aerodynamic effects provided by the aerodynamic surface 32 according to the present invention, reference is made to FIGS. 4A–4E, 5, and 6 which illustrate the aerodynamic mass airflow patterns, pressure distributions (in terms of suction pressure), and pitching moments for an unmanned aerial vehicle having an aerodynamic cross-sectional configuration similar to that shown in FIG. 3. This configuration is similar to that described and claimed in commonly-owned, co-pending U.S. patent application Ser. No. 07/526,092, filed May 18, 1990, entitled AN UNMANNED FLIGHT VEHICLE INCLUDING COUNTER ROTATING ROTORS POSITIONED WITHIN A TOROIDAL SHROUD AND OPERABLE TO PROVIDE ALL REQUIRED VEHICLE FLIGHT CONTROLS, which is incorporated herein by reference.

References to azimuthal orientations in the disclosure with respect to FIGS. 4A–4E, 5, and 6 are with respect to the center of gravity of the UAV and consonant with the disclosure hereinabove, i.e., the 180° azimuthal orientation is forward station of the UAV and the 0°/360° azimuthal orientation is aft station of the UAV. The cross-sectional configuration of the toroidal fuselage illustrated in FIGS. 4A–4E is a schematic illustration for purposes of explanation only. And, while the ensuing discussion is presented in terms of a single, multi-bladed rotor R, the aerodynamic characteristics and effects described hereinbelow are applicable to the UAV 10 of the present invention which has a pair of multi-bladed, counter-rotating rotors 44, 46.

Figure 4A:
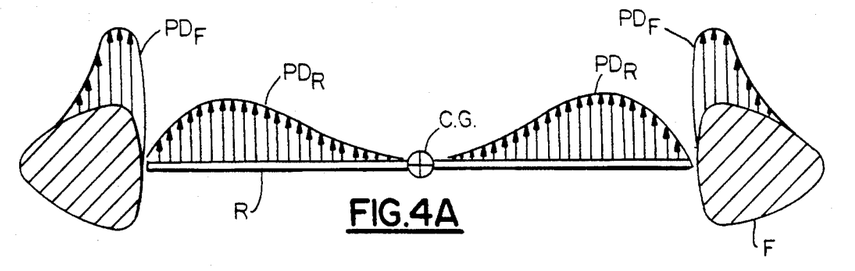
FIGS. 4A–4E illustrate the aerodynamic flight characteristics of an unmanned aerial vehicle having a toroidal fuselage.

FIG. 4A illustrates the aerodynamics of a UAV in hover flight, i.e., the UAV is stationary with respect to, and a predetermined distance above, the ground. To effect hover flight in a UAV, only collective pitch is applied to the rotor R, i.e., all blades exhibit the same blade pitch angle regardless of individual blade azimuthal orientations. Rotation of the rotor R causes mass airflow through the rotor blades, which produces the illustrated pressure distribution $PD_R$ across the span of the blades. Each rotor blade has an equivalent pressure distribution $PD_R$ regardless of its azimuthal orientation due to the application of collective pitch only such that the pressure distribution across the rotor is symmetrical with respect to the center of gravity.

Mass airflow through the rotor R causes air to be drawn across the ventral surface and duct inlet surface of the toroidal fuselage F and to flow through the duct flow surface at a high constant velocity due to the RPM of the rotor R (engine power setting), the arcuate shape of the inlet surface, and the diameter of the duct flow surface. This mass airflow provides a resultant pressure distribution $PD_F$ over the ventral and inlet surfaces of the toroidal fuselage F that is identical for all azimuthal orientations, as illustrated in FIG. 3A. Thus, the toroidal pressure distribution $PD_F$ may be characterized as symmetrical with the fuselage axis.

The rotor and fuselage pressure distributions $PD_R$, $PD_F$ cause lifting forces to be exerted on the rotor R and toroidal fuselage F, respectively, that maintain the UAV in a hover at a fixed spatial point with respect to and at the predetermined distance above the ground plane. As an examination of FIG. 4A shows, the lift forces generated by the rotor R and the toroidal fuselage F of a UAV in hover flight are additive. Moreover, there are no unbalanced pitching moments acting on the UAV when only collective pitch is applied to the rotor R due to the symmetry of the rotor and fuselage air pressure distributions $PD_R$, $PD_F$ as discussed hereinabove.

Figure 4B:
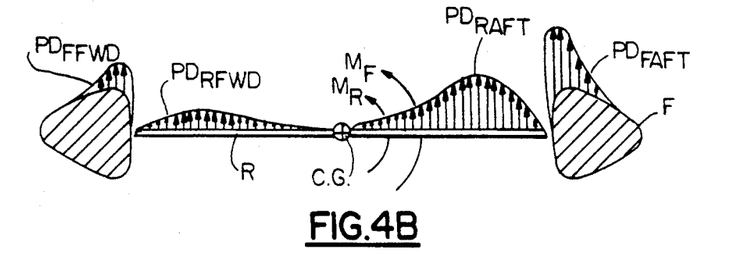
Figure 5:
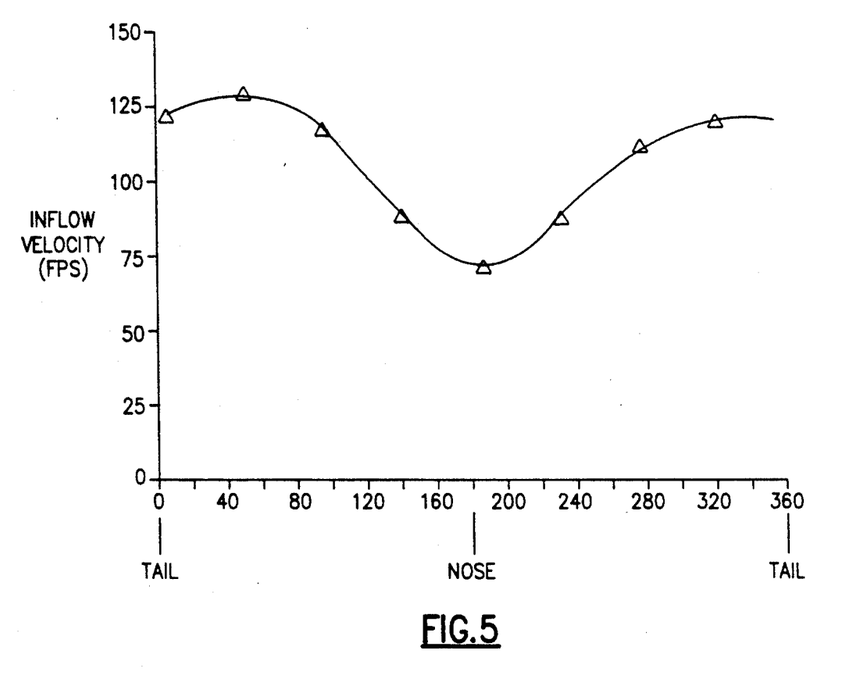
FIG. 5 is a graph illustrating mass airflow velocity variations for the toroidal fuselage at various azimuthal stations for selected application of cyclic input.
Figure 6:
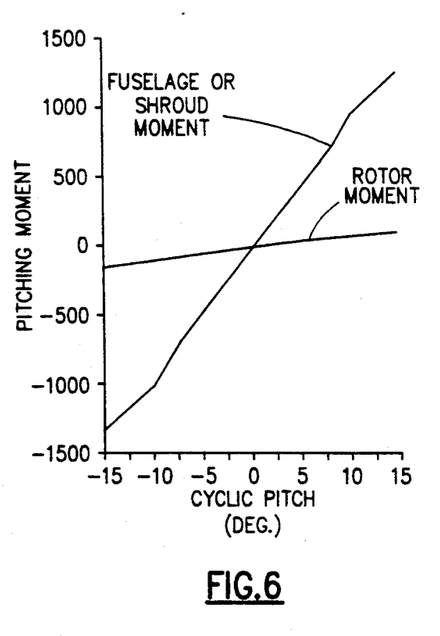
FIG. 6 is graph illustrating the rate of change of rotor and toroidal fuselage pitching moments due to changes in cyclic pitch.

The aerodynamic effects resulting from the application of cyclic pitch to a UAV in hover flight are illustrated in FIGS. 4B, 5, and 6, i.e., the UAV rotor is simultaneously subjected to collective and cyclic pitch. In this flight mode, the individual rotor blades exhibit dissimilar blade pitch angles depending upon blade azimuthal orientation and the direction of the applied cyclic input (forward, lateral, aft, or combinations inbetween). Rotation of the rotor R under the influence of both collective and cyclic pitch causes a mass airflow through the rotor blades that produces an asymmetric rotor pressure distribution that is dependent upon the direction of the applied cyclic input. For example, for an applied cyclic input in the forward direction, the asymmetric rotor pressure distribution illustrated in FIG. 4B results where $PD_{RFWD}$ represents the pressure distribution of a rotor blade having a 180° azimuthal orientation and $PD_{RAFT}$ represents the pressure distribution of a blade having a 0°/360° azimuthal orientation.

An examination of FIG. 4B shows that the magnitude of the resultant pressure distribution is a maximum along the azimuthal orientation opposite the direction of the applied cyclic input and a minimum along the azimuthal orientation in the direction of the applied cyclic input, i.e., $PD_{RAFT}$ is greater than $PD_{RFWD}$. Cyclic pitch, therefore, may be characterized as causing an asymmetric rotor pressure distribution with respect to the center of gravity that results in a net rotor pitching moment $M_R$ in the direction of the applied cyclic input. With respect to FIG. 4B and the example described in the preceding paragraph, the net rotor pitching moment $M_R$ is a counterclockwise moment in the forward direction (180° azimuthal orientation).

The above-described exemplary mass airflow through the rotor R engenders mass airflow across the ventral surface and the arcuate inlet surface of the toroidal fuselage F that produces an asymmetric mass airflow velocity distribution as illustrated in FIG. 5. This asymmetric mass airflow velocity distribution produces the asymmetric toroidal fuselage pressure distribution illustrated in FIG. 4B wherein $PD_{FFWD}$ represents the pressure distribution across the ventral and arcuate inlet surfaces of the toroidal fuselage at the 180° azimuthal orientation and $PD_{FAFT}$ represents the pressure distribution across the ventral and arcuate inlet surfaces of the toroidal fuselage at the 0°/360° azimuthal orientation.

Cyclic pitch, therefore, may also be characterized as causing an asymmetrical toroidal fuselage pressure distribution with respect to the center of gravity that results in a net toroidal fuselage pitching moment $M_F$ in the direction of the applied cyclic input (counterclockwise in FIG. 4B), i.e., $PD_{FAFT}$ is greater than $PD_{FFWD}$. The direction of the applied cyclic input may be varied to cause mass airflow velocity maxima or minima over the ventral and arcuate inlet surfaces of the toroidal fuselage at any desired azimuthal orientation.

The asymmetric pressure distributions generated by the rotor R and the toroidal fuselage F cause lifting forces to be exerted on the rotor F and the toroidal fuselage F. These lifting forces are additive. In this flight mode, however, there are net rotor and toroidal fuselage pitching moments $M_R$, $M_F$ that act in concert (moments are additive) to generate a system moment $M_S$ acting on the UAV.

The relative contributions of the net rotor and toroidal fuselage pitching moments $M_R$, $M_F$ to the system moment $M_S$ are illustrated in FIG. 6. An examination of FIG. 6 reveals that a substantial portion of the system moment $M_S$ is the result of the net toroidal fuselage pitching moment $M_F$ (about 90%). FIG. 6 also graphically illustrates the characteristic that relatively small changes in cyclic pitch will produce minimal changes in the net rotor pitching moment $M_R$ as compared to the significantly larger changes in the net toroidal fuselage pitching moment $M_F$. The significance of this characteristic is important when considering the utilization of cyclic pitch to remediate the nose-up pitch instability of UAVs in translational flight.

Figure 4C:
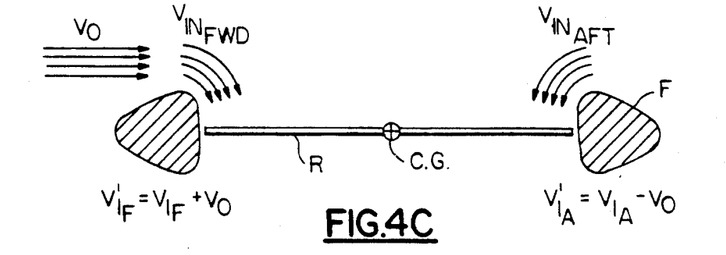
Figure 4D:
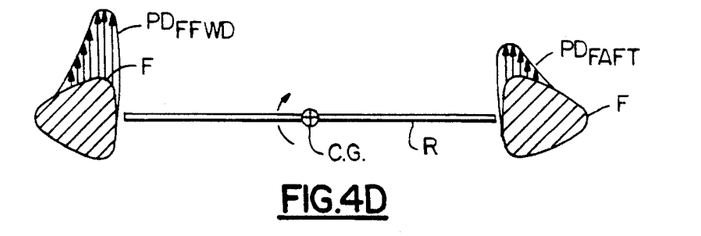
Figure 4E:
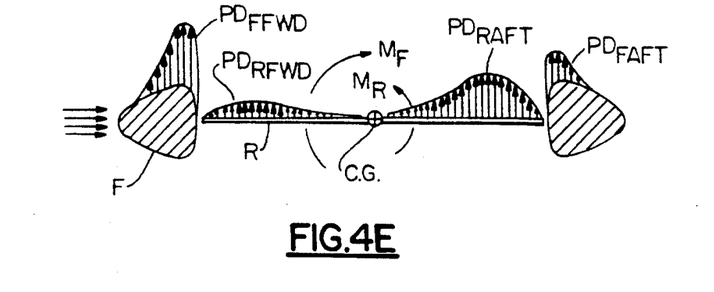

FIGS. 4C–4E illustrate the aerodynamic effects acting on a UAV in translational motion, i.e., the UAV rotor is simultaneously subjected to collective and cyclic pitch while the UAV undergoes translational motion with respect to the ground plane. An applied cyclic input is assumed to cause translational motion in the forward direction, that is, a velocity vector along the 180° azimuthal orientation or to the left in FIG. 4C. In this flight mode, the individual rotor blades exhibit dissimilar blade pitch angle that depend upon blade azimuthal orientation and the direction of the applied cyclic input (forward, lateral, aft, or combinations inbetween). Rotation of the rotor under the influence of both collective and cyclic pitch causes a mass airflow through the rotor blades that produces an asymmetric rotor pressure distribution that is dependent upon the direction of applied cyclic input, as illustrated in FIG. 4E. An examination of FIG. 4E shows that the magnitude of the resultant pressure distribution is maximum along the azimuthal orientation opposite the direction of the applied cyclic input (0°/360°) and a minimum along the azimuthal orientation in the direction of the applied cyclic input (180°, i.e., $PD_{RAFT}$ is greater than $PD_{RFWD}$. Cyclic pitch, therefore may be characterized as causing an asymmetric rotor pressure distribution with respect to the center of gravity that results in a net rotor pitching moment $M_R$ in the direction of the applied cyclic input. With respect to FIG. 4E, the net rotor pitching moment $M_R$ counterclockwise moment in the forward direction (180° azimuthal direction).

The mass airflow through the rotor R engenders mass airflow across the ventral and arcuate inlet surfaces of the toroidal fuselage F. In the case of a UAV in translational flight, however, the resultant velocity of the mass airflow across the ventral and arcuate inlet surfaces at the 180° and 0°/360° azimuthal orientations ($V'_{INFWD}$ and $V'_{INAFT}$ respectively) is affected by the free stream velocity $V_O$ arising from the translational motion of the UAV. The free stream velocity $V_O$ is additive with respect to the velocity $V_{INFWD}$ of the mass airflow over the ventral and arcuate inlet surfaces (due to operation of the rotor R) at the 180° azimuthal orientation and subtractive with respect to the velocity $V_{INAFT}$ of the mass airflow over the ventral and arcuate inlet surfaces (due to operation of the rotor R) at the 0°/360° azimuthal orientation. The resultant velocity differential of the mass airflow over the ventral and arcuate inlet surfaces at the 180° and 0°/360° azimuthal orientations, respectively, produces the respective pressure distributions $PD_{FFWD}$ and $PD_{FAFT}$ illustrated in FIG. 4D.

Since $PD_{FFWD}$ is greater than $PD_{FAFT}$, the pressure distributions generated by the above-described mass airflows across the ventral and arcuate inlet surfaces of the toroidal fuselage result in a net toroidal fuselage pitching moment $M_F$ (clockwise) about the center of gravity as illustrated in FIG. 4E. The magnitude of the net toroidal fuselage pitching moment $M_F$ is greater than the magnitude of the net rotor pitching moment $M_R$, and accordingly, the system moment $M_S$ has the same rotational sense as the net toroidal fuselage pitching moment $M_F$ such that a UAV in forward translational flight, subjected to both collective and cyclic pitch, experiences a nose-up pitching moment $M_S$ (clockwise in FIG. 4E).

An alternative to the use of ancillary aerodynamic structures to counteract the nose-up pitching moment $M_S$ experienced by a UAV in forward translational flight subjected to collective and cyclic pitch is disclosed in commonly-owned, co-pending U.S. patent application Ser. No. 07/526,092, filed May 18, 1990, entitled AN UNMANNED FLIGHT VEHICLE INCLUDING COUNTER ROTATING ROTORS POSITIONED WITHIN A TOROIDAL SHROUD AND OPERABLE TO PROVIDE ALL REQUIRED VEHICLE FLIGHT CONTROLS. The disclosed alternative involves the application of cyclic pitch to an adversely affected UAV in such manner that the net toroidal fuselage pitching moment $M_F$ is effectively cancelled by the net rotor pitching moment $M_R$. The solution is based upon the characteristic described hereinabove that relatively small changes in cyclic pitch produce minimal changes in the net rotor pitching moment $M_R$ as compared to the significantly larger changes in the net toroidal fuselage pitching moment $M_F$, i.e., for a given incremental change in cyclic input rate, the rate of change of the net rotor pitching moment $M_R$ is much less than the rate of change of the net toroidal fuselage pitching moment $M_F$.

As disclosed in the above-identified patent application, the system pitching moment $M_S$ acting upon a UAV in forward translational flight comprises the net toroidal fuselage pitching moment $M_F$, which is a nose-up pitching moment, minus the net rotor pitching moment $M_R$, which is generally a nose-down pitching moment. Mathematically, this may be expressed as:

$$M_S = M_F - M_R$$

During forward translational flight, $$M_F = M_{FF} - M_{CS}$$

where $M_{FF}$ is the toroidal fuselage pitching moment normally produced during forward flight and $M_{CS}$ is the toroidal fuselage pitching moment created in response to changes in cyclic pitch to the rotor assembly. Accordingly, the system moment $M_S$ for a UAV in forward translational flight may be expressed as:

$$M_S = (M_{FF} - M_{CS}) - M_R$$

Figure 7:
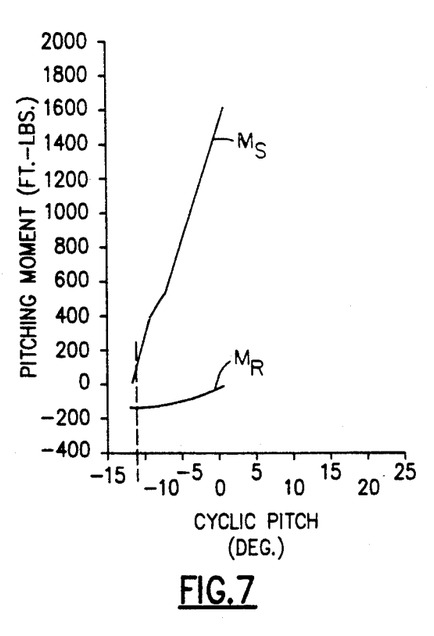
FIG. 7 is a graph illustrating illustrating the interrelation between rotor and toroidal fuselage pitching moments and applied cyclic pitch.

This equation is graphically illustrated in FIG. 7. The curves of FIG. 7 are based upon wind tunnel testing of a UAV having the configuration illustrated in FIG. 3 at a forward translation speed of 70 knots, an angle of attack of $-5°$, and a rotor assembly generating 300 pounds of thrust. An examination of FIG. 7 shows that the application of cyclic pitch in such a manner as to increase $M_{CS}$ results in the net nose-up pitching moment ($M_{FF} - M_{CS}$) being counteracted by the nose-down pitching moment $M_R$ at a cyclic pitch or about $-11°$. Therefore, at an applied cyclic pitch of about $-11°$, the foregoing UAV would be trimmed for forward translational flight.

While the solution disclosed in the above-identified application represents a viable approach for counteracting the fuselage-induced nose-up pitching moment experienced by UAVs in forward translational flight, the inventors of the instant application have determined that the application of cyclic pitch in the manner described incurs a performance penalty. More specifically, the utilization of cyclic pitch to compensate for fuselage-induced nose-up pitching moments unnecessarily increases the power requirements of the UAV in forward translational flight. Cyclic changes effected in the manner described in the preceding paragraphs result in lost lift which must be compensated for by increasing the power to the rotor assembly, i.e., augmenting the lift forces produced by the operation of the rotor assembly.

The inventors of the instant application have determined that the aerodynamic configurations of the toroidal fuselages of prior art UAVs such as illustrated in FIG. 3 were not optimized to utilize the lift forces that occur on the aerodynamic surface of the toroidal fuselage during forward translational flight. Rather, such prior art UAVs have relied upon ancillary aerodynamic structures and cyclic pitch changes to counteract the unavoidable nose-up pitching moment that develops on the arcuate inlet surface of a translating ducted rotor assembly.

Figure 8:
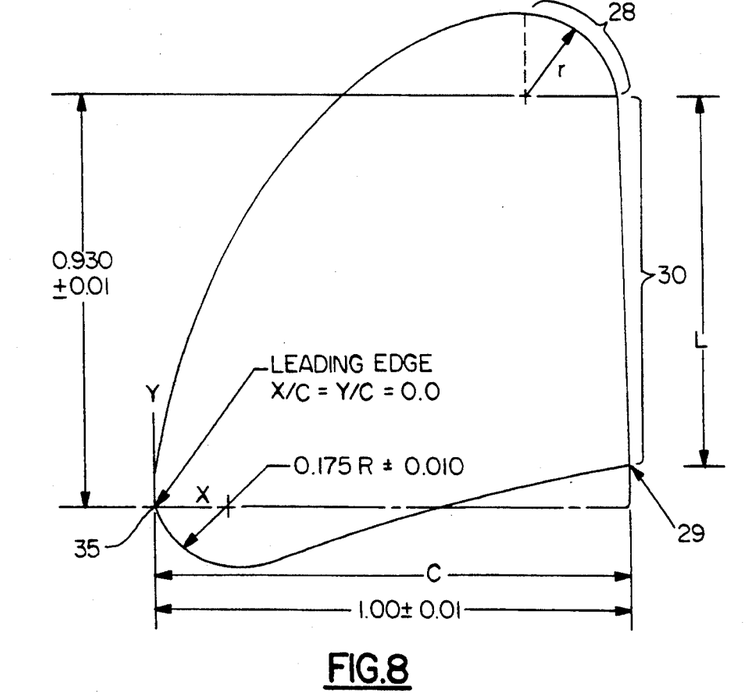
FIG. 8 is a graph illustrating the normalized dimensions of an optimized outer aerodynamic surface according to the present invention.
Figure 9:
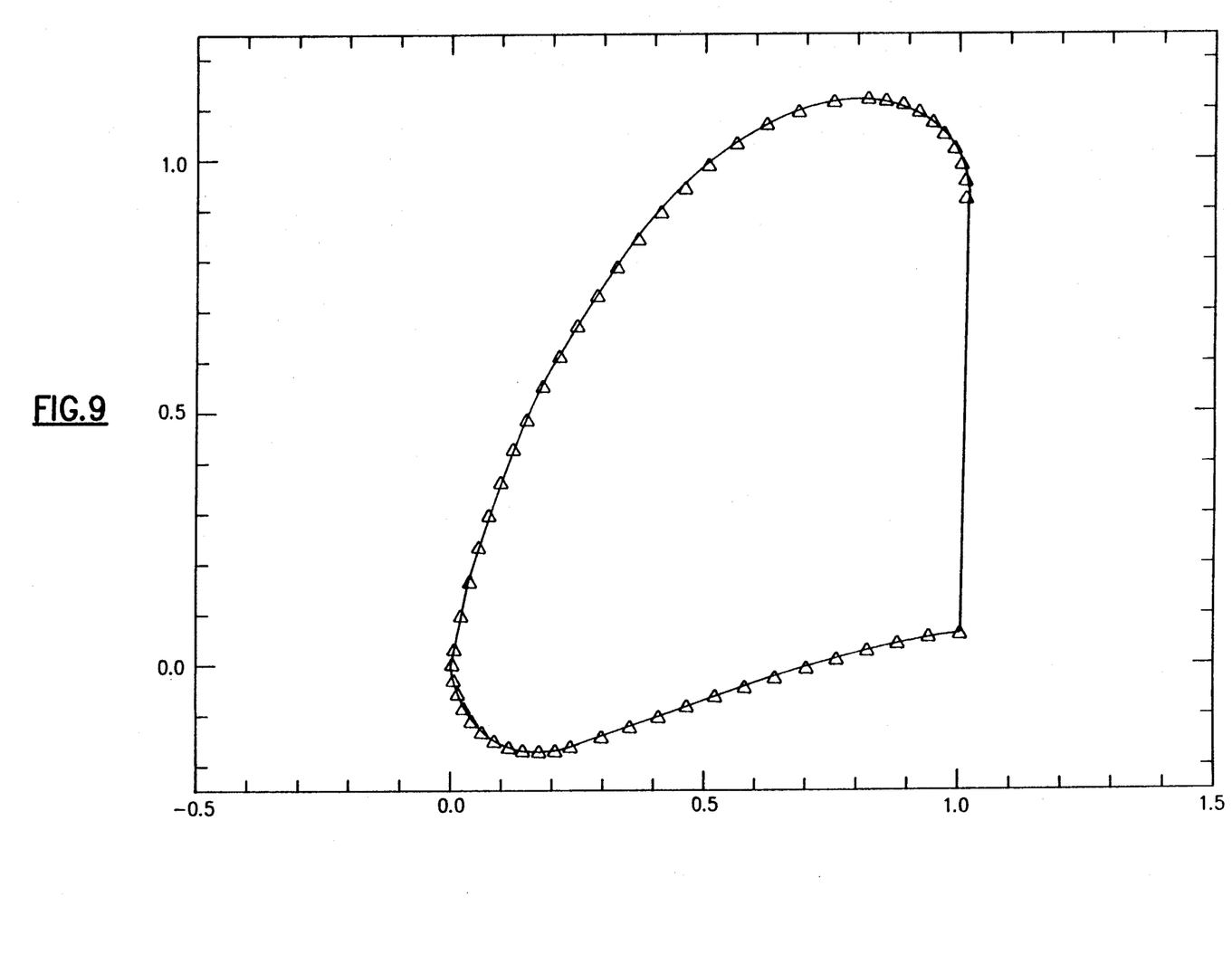
FIG. 9 depicts the coordinates of an airfoil section of the toroidal fuselage of FIG. 2.
Figure 10A:
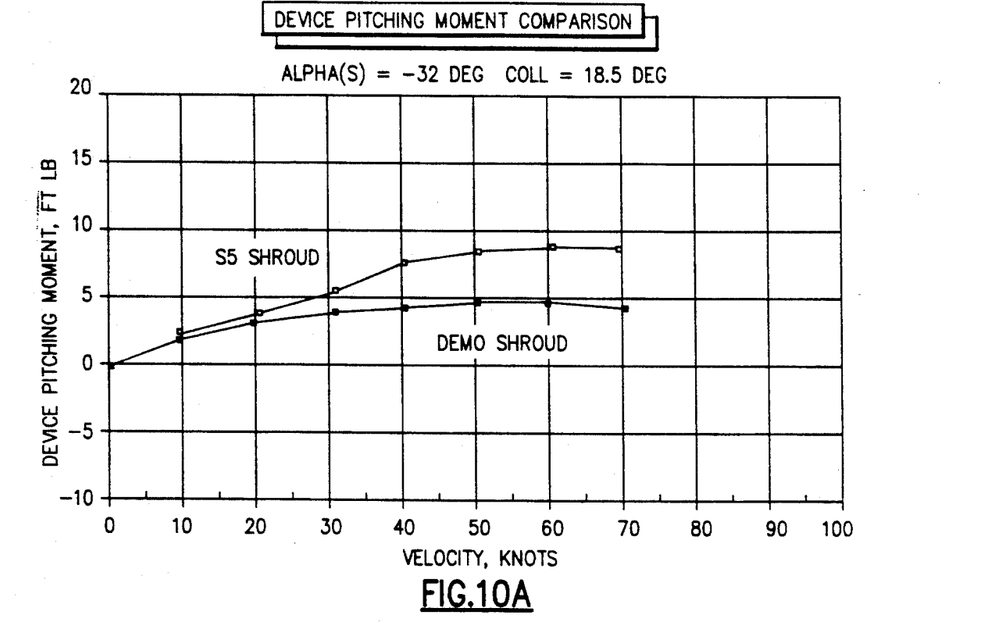
FIGS. 10A–10D are graphical comparisons of the aerodynamic characteristics of the UAV of FIG. 2 and the UAV illustrated in FIG. 3.
Figure 10B:
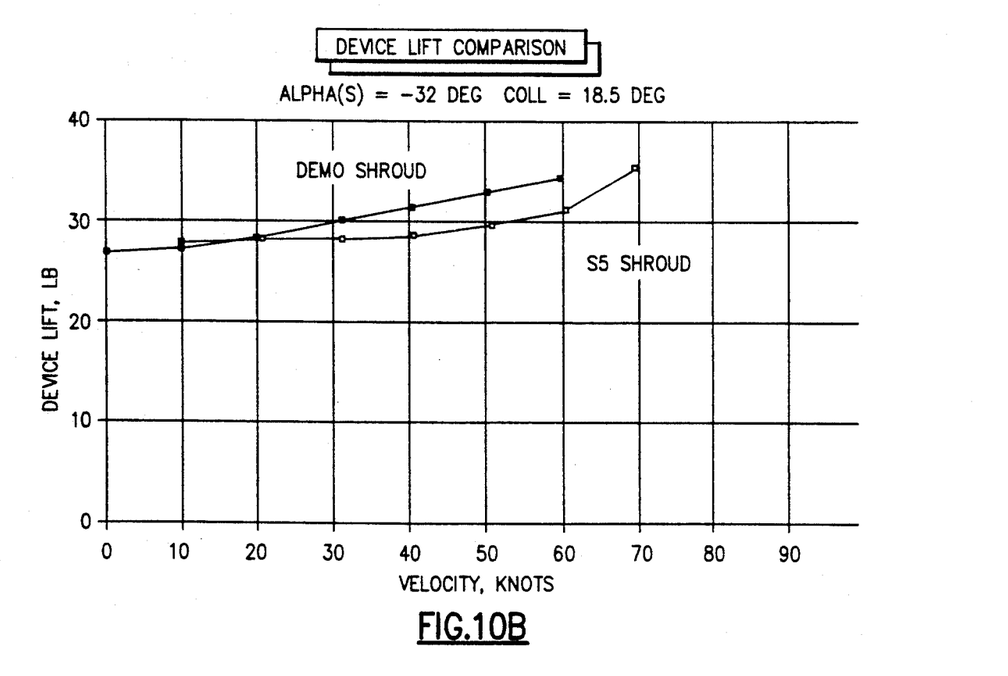
Figure 10C:
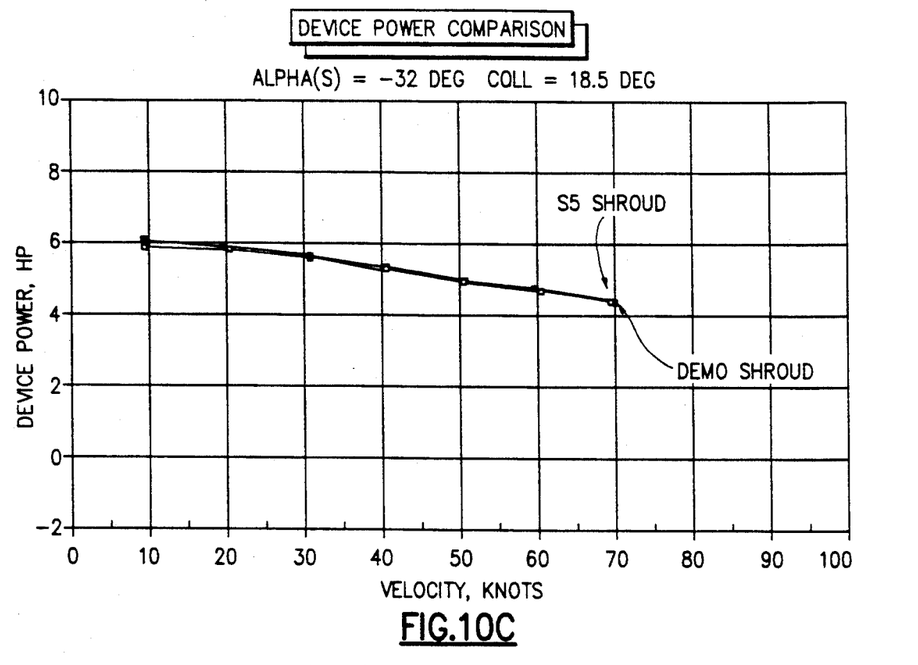
Figure 10D:
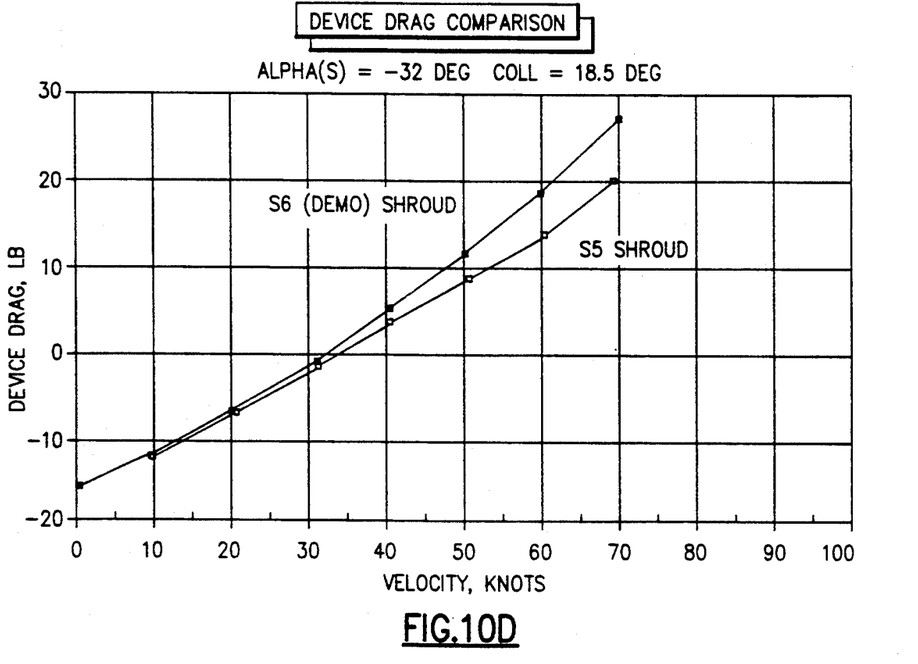

As briefly described hereinabove, the UAV 10 of the present invention has an aerodynamically configured toroidal fuselage 20 that includes an inner duct flow channel 26 and an outer aerodynamic surface 32 as illustrated in FIGS. 2A, 8, and 9. The outer aerodynamic surface 32 of the present invention has been optimized to retain the functional performance provided by the inner duct flow channel 26, i.e., high hover efficiency. The inner duct flow channel 26 comprises the arcuate inlet surface 28 and the cylindrical flow surface 30 as illustrated in FIG. 2A.

The arcuate inlet surface 28 is formed with a predetermined radius of curvature (r) (see FIG. 8) that provides a smooth transition between the ventral surface 34 of the outer aerodynamic surface 32 and the cylindrical flow surface 30 and facilitates mass airflow into the inner duct flow channel 26 at high velocities. The mass airflow over the arcuate inlet surface 28 creates a pressure distribution that contributes to the overall lift produced by the toroidal fuselage 20. Selection of a value for the predetermined radius of curvature is based upon evaluations of the ratios of the arcuate inlet surface 28 radius (r) to the diameter of the counter-rotating rotors 44, 46 versus figure of merit values where figure of merit defines the ratio of actual power required to produce lift in a UAV to the ideal power required. Reference may be had to commonly-owned, co-pending U.S. patent application Ser. No. 07/526,092, filed May 18, 1990, entitled AN UNMANNED FLIGHT VEHICLE INCLUDING COUNTER ROTATING ROTORS POSITIONED WITHIN A TOROIDAL SHROUD AND OPERABLE TO PROVIDE ALL REQUIRED VEHICLE FLIGHT CONTROLS for further details. Essentially, an r/D ratio of 0.04 or greater will produce an acceptable figure of merit.

Selection of a value for the length (L) of the cylindrical flow surface 30 is likewise set out in further detail in the above-identified patent application. The greater the length (L) of the cylindrical flow surface 30 (see FIG. 8), the higher likelihood that overall lift will be provided in approximately equal proportions by the pressure distributions resulting from mass airflow through the rotor assembly 40 and over the toroidal fuselage 20. With the rotor assembly 40 and the toroidal fuselage 20 providing approximately equal lift, smaller diameter rotors 44, 46 may be utilized with the concomitant reduction in size and weight of the UAV 10.

The outer aerodynamic surface 32 is further optimized to provide a pressure distribution that produces high lift forces at the negative angles of attack required for trimmed translational flight of the UAV 10 of the present invention. It will be appreciated that fan lift induces suction on the forward arcuate inlet surface 28, thus producing the adverse nose-up pitching moment on the UAV 10. The high lift forces generated by the outer aerodynamic surface 32 of the toroidal fuselage 20 reduces the required lift of the rotor assembly 40, thereby reducing the undesirable pitching moment. A reduction in power is effected by the decreased requirement for rotor lift and the reduced need for superimposed cyclic pitch (moment trim).

Referring to FIGS. 2A, 8, and 9, the optimized outer aerodynamic surface 32 of the toroidal fuselage 20 of the present invention is illustrated. The outer aerodynamic surface 32 includes a ventral surface 34, a lateral surface 36, and a dorsal surface 38. These surfaces have been arbitrarily defined to facilitate the written description of the configuration of the aerodynamic surface 32, and are not intended to be limiting.

The aerodynamic surface 32 of the present invention includes a leading edge 35 (Y/C=0.0, X/C=0.0) and a trailing edge 29 (the lower the cylindrical flow surface 30 at X/C=1.0, Y/C=0.02375). The chord C (or depth) of the toroidal fuselage airfoil is the orthogonal distance between the leading edge 35 and the plane of the trailing edge 29, as illustrated in FIG. 9. The aerodynamic surface 32 is highly cambered (using the conventional definition of airfoil camber). The dorsal surface 38 may be reflex cambered as required to achieve closure between the leading edge 35 and the trailing edge 29. Both the ventral surface 34 and the lateral surface 36 are slightly convex with respect to the trailing edge 29 of the cylindrical flow surface 30. The portion of the dorsal surface 38 adjacent the leading edge 35 defines a droop portion 38', which is an arcuate surface defined by a normalized radius of 0.175 R (where R is the radius of the rotors 44, 46) as illustrated in FIG. 8. The degree of the droop portion 38' and the reflex camber of the dorsal surface 38 may vary within reasonable tolerances. For example, Table I lists dorsal surface 38 tolerances in terms of X/C, Y/C coordinates.

TABLE I

| X/C | Y/C +/− 0.010 |
|---|---|
| 0.000000 | 0.000000 |
| 0.002555 | −0.051950 |
| 0.034532 | −0.098670 |
| 0.090428 | −0.132080 |
| 0.160558 | −0.146410 |
| 0.232822 | −0.139170 |
| 0.358652 | −0.106940 |
| 0.484917 | −0.075540 |
| 0.611730 | −0.045310 |
| 0.739342 | −0.016860 |
| 0.868303 | 0.008340 |
| 1.000000 | 0.023750 |

A preferred airfoil profile for the toroidal fuselage 20 according to the present invention is set forth in Table II (with respect to FIG. 9).

TABLE II

| X/C | Y/C |
|---|---|
| 1.00000 | 0.06364 |
| 1.00000 | 0.93031 |
| 0.99696 | 0.96503 |
| 0.98794 | 0.99870 |
| 0.97321 | 1.03029 |
| 0.95322 | 1.05885 |
| 0.92858 | 1.08350 |
| 0.90002 | 1.10350 |
| 0.86843 | 1.11823 |
| 0.83477 | 1.12726 |
| 0.80004 | 1.13031 |
| 0.73153 | 1.12345 |
| 0.66537 | 1.10444 |
| 0.60275 | 1.07577 |
| 0.54410 | 1.03963 |
| 0.48942 | 0.99772 |
| 0.43850 | 0.95130 |
| 0.39108 | 0.90130 |
| 0.34692 | 0.84840 |
| 0.30579 | 0.79310 |
| 0.26749 | 0.73581 |
| 0.23186 | 0.67682 |
| 0.19875 | 0.61638 |
| 0.16806 | 0.55467 |

TABLE II-continued

| X/C | Y/C |
|---|---|
| 0.13971 | 0.49186 |
| 0.11360 | 0.42807 |
| 0.08971 | 0.36343 |
| 0.06799 | 0.29802 |
| 0.04841 | 0.23192 |
| 0.03099 | 0.16526 |
| 0.01573 | 0.09806 |
| 0.00266 | 0.03039 |
| 0.00000 | 0.00000 |
| 0.00266 | −0.03039 |
| 0.01055 | −0.05985 |
| 0.02345 | −0.08750 |
| 0.04094 | −0.11249 |
| 0.06251 | −0.13406 |
| 0.08750 | −0.15155 |
| 0.11515 | −0.16445 |
| 0.14461 | −0.17234 |
| 0.17500 | −0.17500 |
| 0.20539 | −0.17234 |
| 0.23485 | −0.16445 |
| 0.29273 | −0.14349 |
| 0.35069 | −0.12275 |
| 0.40873 | −0.10225 |
| 0.46687 | −0.08203 |
| 0.52510 | −0.06214 |
| 0.58351 | −0.04262 |
| 0.64205 | −0.02358 |
| 0.70077 | −0.00512 |
| 0.75972 | 0.01259 |
| 0.81897 | 0.02928 |
| 0.87862 | 0.04446 |
| 0.93887 | 0.05706 |
| 1.00000 | 0.06364 |

FIGS. 10A–10D illustrate various aerodynamic characteristics of the UAV 10 of the present invention (such characteristics being directly attributable to the optimized shape of the outer aerodynamic surface 32), which is identified as the "Demo Shroud", contrasted with the UAV illustrated in FIG. 3. For purposes of comparison, the non-optimal aerodynamic surface of the UAV of FIG. 3 (a hemicylindrical profile) is overlayed with the optimized aerodynamic surface 32 of the present invention in FIG. 2A. An examination of FIGS. 10A, 10B, respectively, shows that the UAV 10 of the present invention experiences lower nose-up pitch moments and generates more lift than the UAV of FIG. 3.

A variety of modification and variations of the present invention are possible in light of the above teachings. It is therefore to be understood that, within the scope of the appended claims, the present invention may be practiced otherwise than as specifically described hereinabove.

What is claimed is:

1. An unmanned aerial vehicle, comprising:
a toroidal fuselage having a coaxial fuselage axis, said toroidal fuselage defining an inner duct flow channel; and
rotor assembly means for providing collective and cyclic pitch to control flight operations of said unmanned aerial vehicle, said rotor assembly means including a pair of multi-bladed, counter-rotating rotors coaxially mounted in said inner duct flow channel to provide high hover efficiency, said multi-bladed, counter-rotating rotors having an axis of rotation coaxial with said fuselage axis;
said toroidal fuselage having an outer aerodynamic surface optimized to retain said high hover efficiency provided by said pair of multi-bladed, counter-rotating rotors coaxially mounted in said inner duct flow channel, to produce a pressure distribution that provides high lift forces in translational flight, to counteract the undesirable nose-up pitching moment produced by lift generated by said rotor assembly means by reducing lift required from said rotor assembly means in translational flight, and to reduce the need for superimposed cyclic pitch for trimmed translational flight;

said outer aerodynamic surface including a leading edge and a trailing edge defined by the lower edge of said inner duct flow channel wherein said trailing edge lies in a plane above the plane of said leading edge.

2. The unmanned aerial vehicle of claim 1 wherein said outer aerodynamic surface of said toroidal fuselage has a chord defined by the orthogonal distance between said leading edge and the plane of said trailing edge, and wherein said outer aerodynamic surface is a highly cambered airfoil profile.

3. The unmanned aerial vehicle of claim 2 wherein said outer aerodynamic surface has a dorsal surface including a droop portion adjacent said leading edge, said droop portion comprising an arcuate surface projecting downwardly from said chord.

4. The unmanned aerial vehicle of claim 3 wherein said pair of multi-bladed, counter-rotating rotors have a predetermined radius, and wherein said arcuate surface comprising said droop portion is defined by a normalized radius of about 0.175 times said predetermined radius of said pair of multi-bladed, counter-rotating rotors.

5. The unmanned aerial vehicle of claim 1 wherein said outer aerodynamic surface further includes a ventral surface having a convex configuration with respect to said trailing edge, a lateral surface having a convex configuration with respect to said trailing edge, and a dorsal surface having a reflex camber defining the airfoil surface between said leading edge and said trailing edge.

6. The unmanned aerial vehicle of claim 5 wherein said reflex camber of said dorsal surface is defined by values of X/C and Y/C, with reference to said leading edge, as presented in Table II.

7. The unmanned aerial vehicle of claim 1 wherein said outer aerodynamic surface has an airfoil profile defined by values of X/C and Y/C, with respect to said leading edge, as presented in Table II.

* * * * *